March 19, 1940.     M. E. MARSALIS     2,193,877
VENTILATOR
Filed June 30, 1938

Martin E. Marsalis
INVENTOR.
BY John M. Spellman
ATTORNEY.

Patented Mar. 19, 1940

2,193,877

UNITED STATES PATENT OFFICE 2,193,877

VENTILATOR

Martin E. Marsalis, Fort Worth, Tex.

Application June 30, 1938, Serial No. 216,655

1 Claim. (Cl. 98—71)

This invention relates to ventilators for chimney, smokestacks, or for any purpose to which it may be applied.

The invention provides improvements in ventilators and has for its primary object the provision of a general purpose ventilator of simple construction and which is so made and operable as to permit a draft through the chimney, flue or other means to which it may be applied and prevent down drafts of air.

Another object of the invention is to provide a ventilator which will be effective in operation in calm weather as when the wind or air is comparatively still.

Another object of the improved ventilator is that it provides a damper means for closing the ventilator opening when required.

The above objects of the ventilator will become apparent from the following detailed description, taken in connection with the accompanying drawing, and in the drawing.

Figure 1:
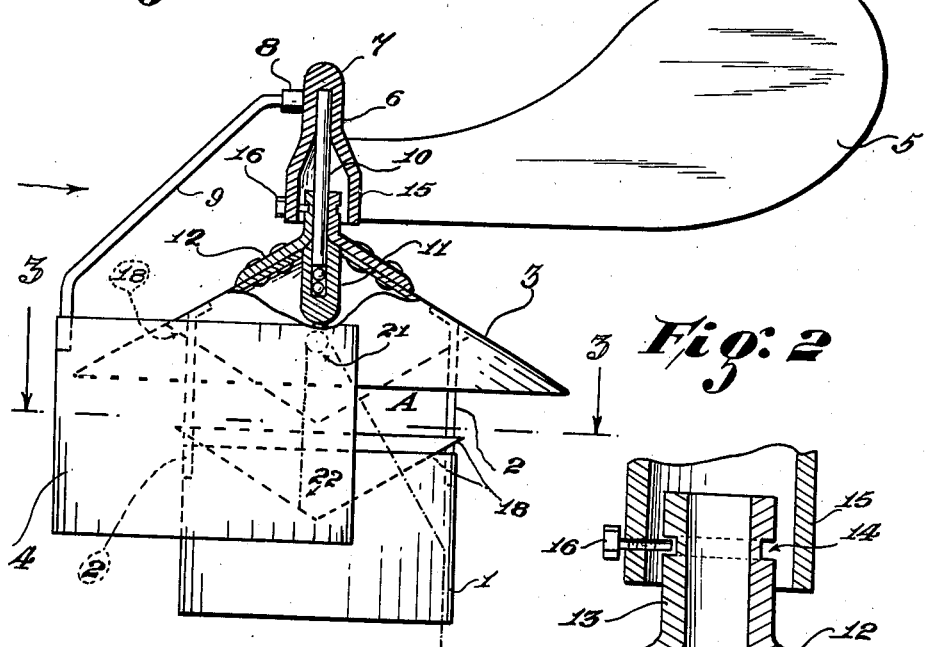
Figure 1 is a side elevational view of the improved ventilator, the view being partly in section and partly shown in broken lines.

Referring in detail to the drawing and wherein the several parts of the invention will be indicated by numerals, in Figure 1 is shown the ventilator in operable position, the lower portion 1 of which may be fastened or secured in any preferred manner to a chimney, smokestack or the like. Welded or riveted or secured to the portion 1 in any preferred way are supports 2 and these supports hold in position the cover 3 of the ventilator. This cap or cover is of conical shape as shown and projects beyond the lower portion 1 and the assemblage of the upper and lower portions 1 and 3 is such as to leave a space A between the lower edge and the upper edge of these two parts, for the outward flow or passage of smoke, air or the like. In this arrangement and construction the ventilator opening is thus completely covered.

The moveable portion of the ventilator consists of a semi-circular apron or shield 4 to which is connected a vane 5, the vane being provided for the purpose of maintaining the shield always in a wind deflecting position to prevent downdrafts from entering the ventilator opening as indicated by the arrow, Figure 1. The shield thus prevents the entrance of wind or drafts through the opening A when the shield is in a wind deflecting position. The wind on striking the shield is directed around the same and comes together or the air current thus divided thus meets behind the apron or shield and a partial vacuum is then present within the area defined by the semi-circular shape of the apron or shield.

For holding the vane 5 in operable position there is provided a member 6 with a hollow interior and a rounded head, the vane 5 being welded, made integral with or otherwise connected to the member 6. A knob or connecting socket 8 is formed on the member 6 and to the latter is connected a rod or bar 9, the rod or bar being in turn welded or riveted to the upper edge or wall of the shield as shown. The vane and shield are thus balanced and held in proper operable position.

The vane and shield constructed as described are made to revolve on the covering or top 3 of the ventilator by means of a rod 10, its upper end being rigidly seated in the member 6. The revoluble operation of the vane and shield also includes the provision of a seat for the lower end of the rod 10, this seat being made in the member 11 which is welded or fastened to the under surface of the top or cover 3 in any suitable manner, or may be made an integral part thereof. In this member 11, which is hollow, are placed two balls 12, and upon which the rod 10 is supported.

The completion of the revoluble mounting of the shield is by means of a cap 12, riveted to the top or covering 3 as shown, the apex of the cone thereof having a hole for the passage of the rod 10. The cap extends upwardly to form a tubular projection or neck 13 and in which the rod 10 also rotates.

For the purpose of preventing violent or sudden gusts of wind from dislodging the vane and shield assembly, the tubular projection 13 is formed with an annular recess or channel 14. In the skirt 15, forming the lower end of the member 6, is carried a set screw 16, the inner end of this screw adapted to ride around in the annular recess with the turning of the shield and vane, and this arrangement effectively prevents dislodgement of the vane and shield assembly.

Figure 2:
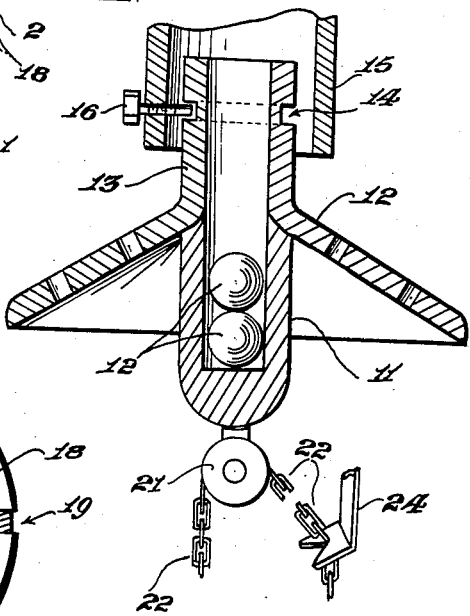
Figure 2 is an enlarged detail vertical sectional view of the upper part of the stationary portion of the ventilator.
Figure 3:
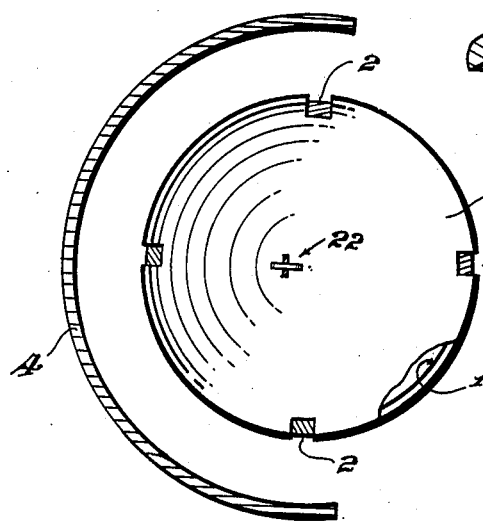
Figure 3 is a cross-sectional view of Figure 1, the view being had along the line 3—3 of said figure.

The ventilator also includes a damper arrangement for shutting off or closing the ventilator opening. This damper, indicated at 18, is made with spaced peripheral notches 19 and is adapted to be slid upwardly and downwardly on the supports 2, the notches embracing the latter. A pulley 21, carried on the lower end of the member 11, and over which a chain 22 rides, is connected to the damper. The damper is thus elevated to an open position of the ventilator by a pull on the chain and the damper is held in an open position by a catch 24, having a notch in which the chain is caught, such as shown in Figure 2.

It is believed that the foregoing description is sufficient to explain the operation of the ventilator and that no further explanation will be necessary. It is to be understood, however, that modifications and alterations are possible apart from the structure shown, and such as may be said to come fairly within the scope and meaning of the appended claim.

What is claimed as new is:

A ventilator comprising a base member, a shield, a vane, and a top member, the said top member being spaced from and connected to the base member to provide a lateral opening and having its peripheral outer edge extending beyond the top edge of the base member, said shield and vane being connected together and a cap member being secured to the said vane, means for pivotally and swingably mounting the cap member of the shield and vane on the top member, the cap member having an apron portion carrying a set screw, the means for swingably mounting the cap member of the vane and shield on the top member comprising a cone member having an aperture in its top portion and being secured to said top member, a bearing with ball members secured to the said cone member and a rod extending upwardly from the balls in the bearing member through the aperture in the cone member and reaching into the cap member, the cone member having an annular recess for the reception of the set screw carried in the apron portion of the cap member for locking the said vane and shield assembly in a rotatable position against accidental dislodgement.

MARTIN E. MARSALIS.